March 22, 1927.
A. F. KLASING
1,621,842
BRAKE OPERATING APPARATUS
Filed Feb. 1, 1922
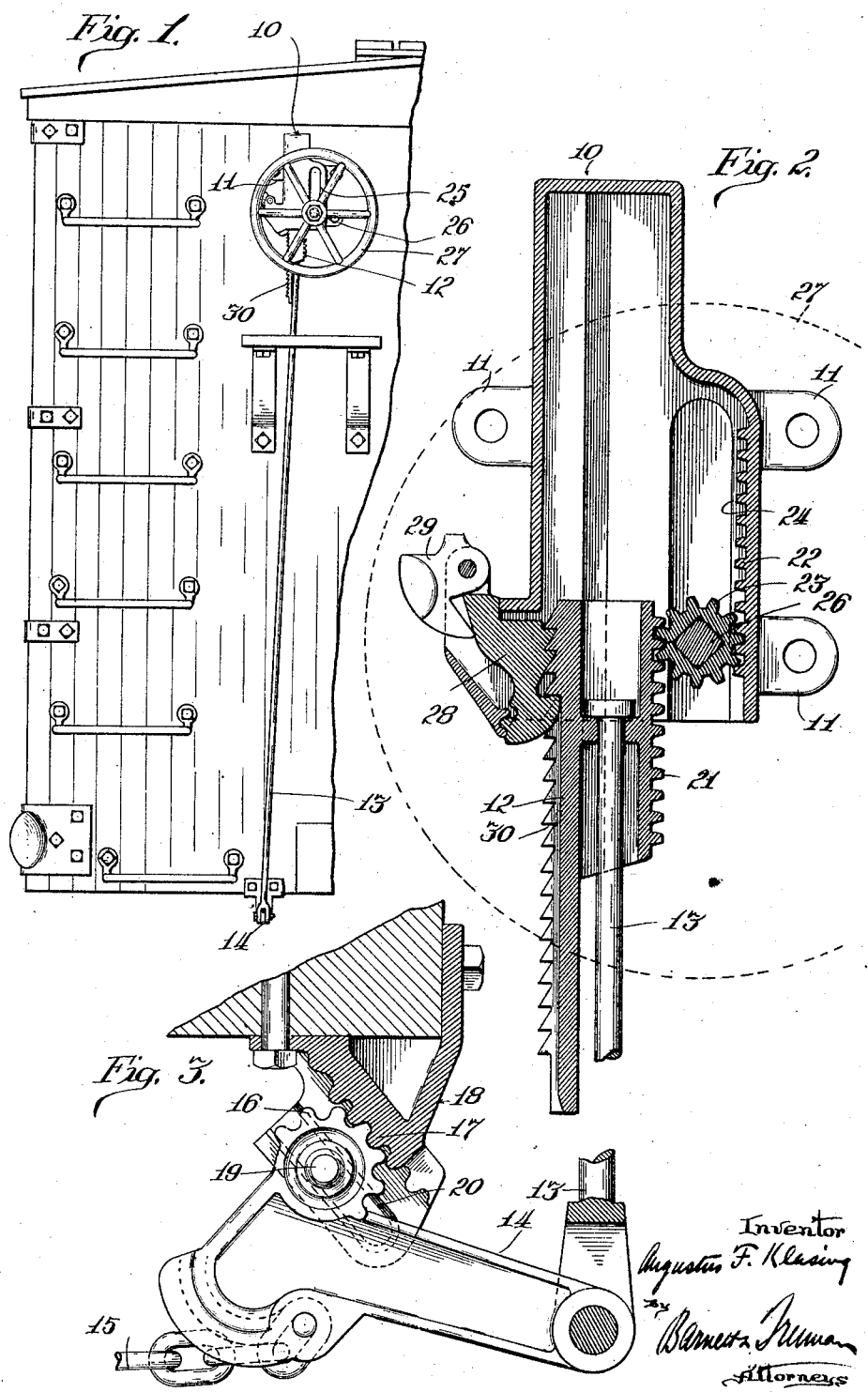

Patented Mar. 22, 1927.

1,621,842

UNITED STATES PATENT OFFICE.

AUGUSTUS F. KLASING, OF CHICAGO, ILLINOIS, ASSIGNOR TO THE KLASING CAR BRAKE COMPANY, A CORPORATION OF COLORADO.

BRAKE-OPERATING APPARATUS.

Application filed February 1, 1922. Serial No. 533,263.

My invention relates to brake operating apparatus, and it has for one of its principal objects the provision of a new and improved form and arrangement of operating parts comprising a hand wheel which is rotatably mounted upon a movable axis whereby the friction is reduced to a minimum, and a high efficiency is attained. My improved operating mechanism is preferably provided for use in connection with a vertically movable bar which is connected with the brake rigging of a car by means of a bell crank lever which, in turn, is mounted upon a movable axis. It is another object of my invention to improve devices of this type in sundry details, hereinafter pointed out.

The preferred means by which I have accomplished my several objects is illustrated in the accompanying drawing, and is hereinafter specifically described.

That which I believe to be new and desire to cover by this application is set forth in the claims.

In the drawing—

Fig. 1 is an end view of a car equipped with my improved brake operating apparatus, part of the end of the car being broken away.

Fig. 2 is a central vertical section through the operating parts within the housing shown in Fig. 1; and Fig. 3 is an enlarged detail view, partly in section, showing the arrangement of the bell crank lever.

Referring to the several figures of the drawing, in which corresponding parts are indicated by the same reference characters, 10 indicates a housing secured by means of lugs 11 upon the end of a car. A bar 12 is vertically movable within the housing 10, such bar being connected by means of a rod or link 13 with a bell crank lever 14 which is connected by means of a chain 15 with the brake rigging of the car, as is clearly shown in Fig. 3, the bell crank lever 14 being provided with a segmental gear 16 formed thereon which meshes with a diagonally disposed rack bar 17 forming a part of the bracket 18 by which the bell crank lever is held in position upon the car. Trunnions 19, carried by the bell crank lever 14, are slidable within diagonally disposed grooves 20 for holding the bell crank lever in position, the arrangement being such that upon the rotary movement of the bell crank lever in counter-clockwise direction in Fig. 3, the lever is moved downwardly and towards the right in said Fig. 3.

The means for moving the bar 12 upwardly within the housing 10 for giving the bell crank 14 and its chain 15 the required movement for taking up the slack of the brake rigging and for applying the brakes, comprises a rack bar 21 formed upon the bar 12, a second rack bar 22 formed upon the inner face of the housing 10 in spaced relation to the rack bar 21, and gear means 23 interposed between the rack bars 21 and 22, and movable vertically within the housing 10.

In the construction shown, the gear means 23 comprises a single spur gear which meshes directly with both of the rack bars 21 and 22, but it will be understood that other forms of gearing might be substituted for the single gear without departing from the spirit of my invention. The gear 23 is movable vertically within the housing 10 along vertically extending grooves 24 and 25, as illustrated in Figs. 1 and 2, the arrangement being such that, upon rotation of the gear 23 in clockwise direction in Fig. 2, the gear 23 is caused to move upwardly along the rack bar 22, causing the rack bar 21 to move upwardly at double the speed of movement of the gear 23. For giving the desired rotary movement to the gear 23, I have provided the shaft 26 substantially square in cross section for causing the gear 23 to rotate therewith. Upon the outer end of the shaft 26 I have provided a hand wheel 27 by the use of which the shaft and gear can be turned to the best advantage. The hand wheel 27 is indicated by dotted lines in Fig. 2.

For holding the bar 12 releasably in raised position when moved upwardly by the use of the hand wheel 27, I have provided a dog 28 which is preferably of the type described and claimed in my application No. 333,978. The action of the dog 28 is controlled by a pivotally mounted regulating device 29 of the type shown and described in my said application. It is believed to be sufficient description herein to state that with the device 29 in the position shown in Fig. 2, the dog 28 is held in operative position for engaging the rack bar 30 of the vertically movable bar 12, and that when the regulating device 29 has been turned to the limit of its movement in clockwise direction in said Fig. 2, it serves to hold the dog 28 out of operative position so as to permit downward movement of the bar 12.

As will be readily understood, when the hand wheel 27 is turned in clockwise direction in Fig. 1, the rack bar 21 and the bar 12 are moved upwardly for carrying the link 13 upwardly, serving to give the bell crank lever 14 a rotary movement in counter-clockwise direction in Fig. 3, for applying the brakes in the well understood manner. If it is desired that the brakes be locked in operative position, the regulating device 29 is maintained in the position shown in Fig. 2; if on the other hand, it is desired that the application of the power to the brakes be left completely in the control of the brakeman, the regulating device 29 is turned into its reverse position, as above described, for throwing the dog 28 out of operative position, whereupon the brakeman is free to apply just as much or as little pressure as may be desired upon the brakes, being able very quickly to vary the pressure as conditions may require.

While I prefer to employ the form of construction shown in my drawing, and above described, it will be understood that I do not wish to limit myself to the precise form shown, except as hereinafter specifically claimed, inasmuch as it is obvious that changes might be made in the structure without departing from the spirit of my invention.

I claim:

1. Brake operating apparatus comprising a frame, a hand wheel rotatably mounted on said frame on a vertically movable horizontally disposed axis, means adapted upon the rotation of said hand wheel in one direction to give the wheel a vertical movement, and brake operating means actuated by the vertical movement of said hand wheel.

2. Brake operating apparatus comprising a frame, a vertically disposed rack bar thereon, a gear rotatably mounted on said frame and movable vertically in mesh with said rack bar, a hand wheel carried by said gear and adapted to move therewith, and brake operating apparatus actuated by the vertical movement of said hand wheel.

3. Brake operating apparatus comprising a frame, a gear slidably mounted on said frame, a hand wheel carried by said gear and adapted to move therewith, means adapted on the rotation of said hand wheel to give the wheel and the gear a vertical movement, and a rack bar slidably mounted with respect to said frame and meshing with said gear adapted to be moved upwardly by said gear upon the turning of said hand wheel.

4. Brake operating apparatus comprising a frame, a vertically disposed rack bar carried by said frame, a second rack bar slidably mounted with respect to said frame in spaced relation with said first named rack bar, gear means rotatably mounted on said frame and movable vertically therein, being in mesh with both of said rack bars on opposite faces thereof, and a hand wheel carried by said gear means and movable therewith for rotating the gear means and causing vertical movement of said second rack bar.

AUGUSTUS F. KLASING.